(12) United States Patent
Lerner et al.

(10) Patent No.: US 9,677,892 B2
(45) Date of Patent: Jun. 13, 2017

(54) SYSTEM AND METHOD FOR ASSESSING QUALITY OF TRANSIT NETWORKS AT SPECIFIED LOCATIONS

(75) Inventors: Matthew Lerner, Seattle, WA (US); Jesse G. Kocher, Seattle, WA (US); Josh Herst, Seattle, WA (US)

(73) Assignee: WALK SCORE MANAGEMENT LLC, Seattle, WA (US)

( * ) Notice: Subject to any disclaimer, the term of this patent is extended or adjusted under 35 U.S.C. 154(b) by 220 days.

(21) Appl. No.: 13/587,849

(22) Filed: Aug. 16, 2012

(65) Prior Publication Data

US 2013/0046586 A1 Feb. 21, 2013

Related U.S. Application Data

(60) Provisional application No. 61/524,260, filed on Aug. 16, 2011, provisional application No. 61/539,944, filed on Sep. 27, 2011.

(51) Int. Cl.
*G01C 21/26* (2006.01)
*G06Q 10/06* (2012.01)
*G06F 17/30* (2006.01)

(52) U.S. Cl.
CPC ....... *G01C 21/26* (2013.01); *G06F 17/30241* (2013.01); *G06F 17/30958* (2013.01); *G06Q 10/06* (2013.01)

(58) Field of Classification Search
CPC ......... G06Q 10/00; G06Q 40/00; G06F 17/60
USPC .............................................. 705/7.11–7.39
See application file for complete search history.

(56) References Cited

U.S. PATENT DOCUMENTS

| | | | |
|---|---|---|---|
| 6,542,748 B2 * | 4/2003 | Hendrey et al. | 455/456.1 |
| 7,634,800 B2 * | 12/2009 | Ide et al. | 726/3 |
| 8,473,197 B2 | 6/2013 | Horvitz | |
| 2002/0035535 A1 * | 3/2002 | Brock, Sr. | 705/37 |
| 2006/0184314 A1 | 8/2006 | Couckuyt et al. | |
| 2006/0247956 A1 * | 11/2006 | Rosen et al. | 705/7 |

(Continued)

OTHER PUBLICATIONS

Zheng et al (Understanding Transportation Modes Based on GPS Data for Web Applications) discloses a GPS system and a transportation mode.*

(Continued)

*Primary Examiner* — Romain Jeanty
(74) *Attorney, Agent, or Firm* — Knobbe, Martens, Olson & Bear, LLP

(57) ABSTRACT

A system and method is disclosed for generating and providing assessments of transit network characteristics for specified locations. The system receives a specified location, generates an assessment of the received location, and provides a generated visual representation of the received location to a client system. Determining a location assessment may be based on transit network information related to the distance between a specified location and the nearest point of access/egress on transit network routes that are accessible from the specified location, the frequency at which the transit network routes stop at the point of access/egress on the transit network routes that are accessible from the indicated location, or the transportation mode used for at least one of the transit network routes that are accessible from the specified location. The initial location assessment may be updated periodically, in response to changes in system status, or on demand by user request.

27 Claims, 4 Drawing Sheets

(56) References Cited

U.S. PATENT DOCUMENTS

| | | |
|---|---|---|
| 2006/0287810 A1* | 12/2006 | Sadri et al. .................. 701/200 |
| 2008/0046298 A1 | 2/2008 | Ben-Yehuda et al. |
| 2008/0208443 A1 | 8/2008 | Massie et al. |
| 2009/0088967 A1 | 4/2009 | Lerner et al. |
| 2009/0089149 A1 | 4/2009 | Lerner et al. |
| 2011/0177845 A1 | 7/2011 | Fasold |
| 2013/0046795 A1 | 2/2013 | Borgerson et al. |
| 2013/0204527 A1 | 8/2013 | Schilling et al. |

OTHER PUBLICATIONS

Zheng et al (Understanding Transportation Modes Based on GPS Data for Web Applications) discloses a GPS system and transportation mode.*

Non-Final Office Action, U.S. Appl. No. 13/587,680, Mail Date Dec. 3, 2013, 12 pages.

Final Office Action, U.S. Appl. No. 13/587,680, Mail Date May 15, 2014, 11 pages.

* cited by examiner

SYSTEM AND METHOD FOR ASSESSING QUALITY OF TRANSIT NETWORKS AT SPECIFIED LOCATIONS

CROSS-REFERENCE TO RELATED APPLICATION(S)

This application claims the benefit of U.S. Provisional Patent Application No. 61/539,944, entitled "SYSTEM AND METHOD FOR THE CALCULATION AND USE OF COMMUTE TIMES IN SEARCH AND OTHER APPLICATIONS" and filed Sep. 27, 2011, and U.S. Provisional Patent Application No. 61/524,260, entitled "SYSTEM AND METHOD FOR ASSESSING QUALITY OF PUBLIC TRANSIT" and filed Aug. 16, 2011, each of which is incorporated herein by reference in its entirety.

BACKGROUND

For many people who rely on public transit to meet day-to-day transportation needs, the availability of public transit in particular areas—such as at home or at work—is a particular concern. Although a transit rider may use certain services to search for public transit routes between two specific locations, current services do not enable a user to easily assess the overall quality of public transit in a particular area. For example, if a user is interested in assessing the quality of public transit at an apartment that the user might consider leasing, the user may be forced to manually search for transportation routes between that apartment and several different locations, such as the user's work office, dentist's office, or favorite restaurant. Even then, the user may gain some appreciation for routes available to those specific searched destinations but would have very little insight into the quality of public transit from the apartment to myriad other destinations to which the user could expect to travel at future times. Moreover, if the user is considering multiple apartments located in different areas, the labor involved with the manual task of searching specific routes increases substantially. Current services are further inefficient and undesirable because they fail to allow the user to easily compare and contrast the quality of public transit among the multiple potential apartments. A need therefore exists for more comprehensive systems that can evaluate and present commute information for multiple options in an expedient manner.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION

Figure 1:
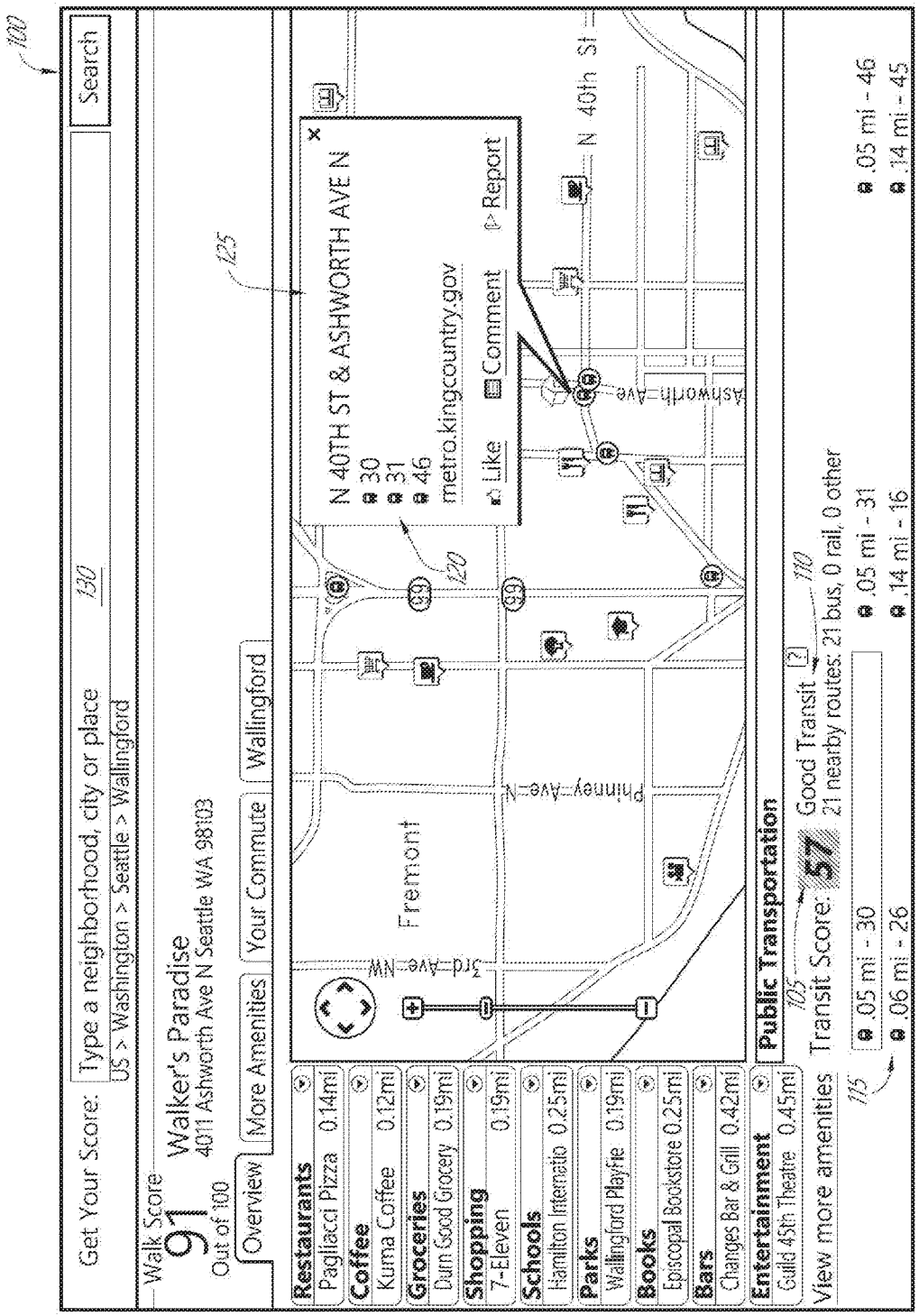
FIG. 1 is a screen display of an example visual representation of a location assessment related to a transit network.

A system and method is disclosed which generates and provides assessments of specified locations based on the availability of transit network service at those locations (hereinafter, the "Location Assessment Provider System (LAPS)"). The assessment takes into account multiple factors, including the distance from the specified location to a point of access on one or more available transit network routes, the frequency of the transit network routes, the type of transit network routes, and additional factors that may include user preferences. For example, a user may indicate which transit network modes are preferred as well as which transit modes are to be avoided or used only as a last resort. As another example, a user may indicate one or more times of day on which the assessment should be based, thereby allowing the user to receive an assessment that takes into account the availability of a transit network in the morning hours (e.g., while on the way to school at 7:40 a.m.) versus the evening hours (e.g., on the way back home from school at 4:30 p.m.). A person of ordinary skill in the art will appreciate that the user may customize the location assessment based on additional user preferences, including for example the availability of a transit network to one or more particular destinations to which the user travels frequently, the length of the commute time, or the cost.

The location assessment provided herein is reliable and readily adapts to changes in the transit network. In a transit network system, frequent changes in system status may occur as a result of multiple factors that affect transit routes. For example, a transit authority may add new service routes or increase the frequency of existing routes to meet increases in rider demand. Similarly, a transit authority may retire existing routes or reduce the frequency of certain routes that are not in high demand. In addition, the status of a transit network system may change unexpectedly due to a variety of factors, including maintenance outages that may result in transit vehicles being taken out of service, upgrades to transit system infrastructure such as bus tunnels or rail tracks, or particularly high ridership that introduces time delays due to the volume of passengers entering and exiting transit vehicles. In such situations, the method of system provided herein enable the location assessments to dynamically reflect the changes through updates that occur periodically, in response to changes in system status, or on demand by user request.

Embodiments described herein provide an enhanced computer- and network-based method and system for generating and providing location assessments related to transit networks. Transit networks may include traditional mass transportation that is typically provided by local and regional governments, such as city buses, trains, and ferry routes. However, transit networks as disclosed herein may encompass various other transportation systems that carry multiple passengers on a regular or semi-regular schedule. For example, transit networks may include privately owned bus lines and airlines, as well as carpools. In general, transit networks are transportation networks having defined routes and defined points of entrance or exit from the transit network.

The LAPS generates and provides assessments of specified locations based on the availability of transit network service. In determining the assessment, the LAPS may take into account multiple factors, including the distance from the specified location to a point of access on one or more available transit network routes that are accessible from the specified location, the frequency of the transit network routes (e.g., how frequently a bus or train is scheduled to stop at a nearby station), the type of transit network route (e.g., bus, train, light rail, ferry, etc.), as well as other factors that may include user preferences (e.g., availability of transit on a certain day or time of day; amount of time to travel from source to destination via transit network; cost). A LAPS may be used on its own to generate and provide location assessments related to transit networks, or may be embedded within or used by another code module or application to provide location assessment functionality. For example, in some embodiments, the LAPS provides a transit assessment called a "Transit Score," which provides a visual indication of the availability of a transit network at a specified location. This Transit Score, as described further below, may be provided as a network accessible application, such as a Web page specified by a Uniform Resource Identifier ("URI") and displayable via a Web browser, or, may be provided via a server or as a Web service and integrated into another, perhaps third party, application.

As mentioned, a location assessment is generated relative to a specified location. A location used to serve as a basis for generating a location assessment may be specified by any suitable means, including explicitly specified, for example, using identifying information such as a physical address, a latitude/longitude specification, or an indication on a map. A location may also be implicitly specified, for example, by deducing a nearest building to a stop on a transit route (e.g., clicking on, selecting, and/or hovering over, a point) using an interacting mapping application. A location may also be specified via Location Based Service ("LBS") features of an interactive mapping application or mobile device. For example, LBS functionality installed on a mobile phone may sense the physical location of the mobile phone and provide the sensed location to the LAPS as the specified location. Other means of specifying locations relative to some other point or area may also be incorporated into a LAPS, such as by allowing users to drag icons, draw areas, specify cities or particular neighborhoods, or perform other operations within an interactive mapping application.

Various embodiments of the invention are described below. The following description provides specific details for a thorough understanding and an enabling description of these embodiments. One skilled in the art will understand, however, that the invention may be practiced without many of these details. In addition, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

In the following description, numerous specific details are set forth, such as data formats, network protocols, and code sequences, etc., in order to provide a thorough understanding of the described techniques. The embodiments described also can be practiced without some of the specific details described herein, or with other specific details, such as changes with respect to the ordering of the code flow, different code flows, etc. Thus, the scope of the techniques and/or functions described is not limited by the particular order, selection, or decomposition of steps described with reference to any particular routine and/or system.

FIG. 1 is an example screen display of an example visual representation of a location assessment related to a transit network. According to the example application illustrated by FIG. 1, a user specifies a location as a street address via the user input control 130. In addition, although some of the described embodiments determine location assessments with respect to a given street address, locations may be specified in other ways. For example, locations may be specified by partial physical addresses (e.g., street intersections, block addresses), latitude and longitude coordinates, neighborhood or place names, based on one or more user inputs (e.g., indicating a location on a map), or via some other coordinate system. In addition, locations are not limited to "point" locations, and can equivalently be areas, such as neighborhoods, cities, regions (e.g., western Washington state), states, countries, etc. Also, some embodiments may determine location assessments for multiple locations specified in bulk or batch form. For example, the quality of a transit network may be calculated within a certain geography such as a city or neighborhood. Other permutations and combinations are contemplated.

In response to the user specifying a location, the LAPS provides the illustrated location assessment. The Transit Score 105 is a measure, on a scale of 0 to 100, of the availability of a transit network of an area surrounding the provided street address; hence it is referred to as a "Transit Score." A transit scale (not illustrated) may be provided that presents the Transit Score as a position on a scale, with higher Transit Scores being presented further rightwards on the scale. In some embodiments, the transit scale may also make use of colors, such as by using a spectrum of colors from red (e.g., reflecting low transit scores) to green (e.g., reflecting high transit scores). In other embodiments, shades of gray or other techniques may be utilized to provide a user with an intuitive understanding of the determined transit score. Other embodiments may use other rating systems such as stars or other indications of quality.

Along with Transit Score 105, the display may provide a visual representation 110 that characterizes the Transit Score. For example, a Transit Score in the range of 90 to 100 may be characterized as a "Rider's Paradise," meaning that the specified location offers world-class public transportation; a score in the range of 70 to 89 may be characterized as "Excellent Transit," meaning that the specified location offers transit that is convenient for most trips; a score in the range of 50 to 69 may be characterized as "Good Transit," meaning that the specified location offers many nearby public transportation options; a score in the range of 25 to 49 may be characterized as "Some Transit," meaning that the specified location offers only a few nearby transportation options; and a score in the range of 0 to 24 may be characterized as "Minimal Transit," meaning that it may be difficult to find a transit network route near the specified location.

As depicted in FIG. 1, the visual representation of the location assessment may also include information 115 pertaining to specific transit network route information. For example, the visual representation may include icons (for example, icon 120) that represent an applicable transportation mode, the distance from the specified location to the nearest point of access to the transit network (e.g., a station, stop, parking lot where carpools may be joined, or other transfer point) that services the route, or the route number. As illustrated in the example of FIG. 1, the specific route information 115 may correspond to a bus icon that is situated next to a description reading "0.05 mi-30." In this example, the bus icon corresponds to a bus transportation mode (as opposed to, for example, a train icon that might indicate a light rail transportation mode). The "0.05 mi-30" notation indicates a corresponding Bus Route #30 that is situated 0.05 miles from the specified location. Additionally, if the user selects route information 115 (for example, by using a mouse or other computer pointing device to click on the route information in a Web browser), the visual representation 100 may be updated for one or more icons 120 that represent the physical map location of the corresponding transit network station or other point of access to the transit network. The updated visual representation may also include additional related information 125, such as the nearest cross streets to the transit network station (e.g., "N 40TH ST & ASHWORTH AVE N"), additional routes serviced by the same transit network station, stop or transfer point (e.g., Bus Routes #30, #31, and #46), a hyperlink to the transit authority responsible for the transit network route, hyperlinks that enable a rider to leave a comment or make a report, and hyperlinks that interface with social media Web sites such as Facebook or Twitter.

In some embodiments, the Transit Score is calculated by summing the usefulness of each transit network route that is accessible from a specified location. The usefulness of a route is determined based on at least three factors, including the distance from the specified location to the nearest station servicing the route, the route service level, and the transportation mode. A distance decay function is used to determine a penalty corresponding to the distance from the specified location to a station servicing the route. By using the multiplicative inverse of the distance, the distance is weighted such that it decays as a function of the distance from the location. For example, a route having a station that is located farther away from a specified location will be subject to a more severe distance penalty than a route having a station that is located nearer to the specified location. Further details on the distance decay function may be found in U.S. patent application Ser. Nos. 12/151,724 and 12/151,726, both entitled SYSTEMS, TECHNIQUES, AND METHODS FOR PROVIDING LOCATION ASSESSMENTS, both filed May 7, 2008, the entirety of which are both hereby incorporated by reference in their entirety.

In addition to a distance penalty, the usefulness of a route also may take into account a route service level that corresponds to the frequency at which scheduled stops occur on the transit route. For example, a bus route that stops near a specified location every fifteen minutes would have a more favorable route service level than a different bus route that stops near the specified location only once each hour. A person of ordinary skill will appreciate that frequency may be measured in a variety of ways, including the number of stops per hour or day, or the number of stops within any designated time period such as a rush hour period when the transit network route typically operates at higher ridership levels.

The usefulness of a route further takes into account the transportation mode, such as, for example, heavy or light rail, ferry, cable car, or other modes of transportation. For example, heavy or light rail may be weighted 2×, while ferry or cable cars may be weighted 1.5× and buses may be weighted 1×. The weights may be provided by the LAPS provider and may be non-configurable by the user. Alternatively, the weights may be provided or configured by the user to reflect individual user preferences. For example, a user who prefers riding a bus more than riding a train may weight buses 3.5× and trains 1×.

The Transit Score algorithm calculates a score for a specific location by summing the relative usefulness of all transit network routes that are accessible from the specified location. Before arriving at the reported Transit Score, a raw transit score may first be calculated according to the following formula:

raw_transitscore(location)=sum for all routes (route_service_level*mode_weight*distance_func(distance_to_nearest_stop_for_route))

As reflected in the above raw_transitscore formula, a sum for each transit network route is calculated by multiplying the route service level by the mode weight and the distance penalty, as determined by a distance decay function. The sum for each transit network route is combined to calculate a raw Transit Score. Since any measure of transit infrastructure (number of stops, number of weekly trips, etc.) will have its own unique range, it may be necessary to normalize the raw Transit Score to generate a Transit Score from 0 to 100 that enables comparisons between different locations and/or areas. Accordingly, the raw Transit Score may be normalized according to the following formula:

transit_score(location)=log(raw_transitscore(location))/perfect_score

The amount of transit infrastructure among multiple areas can vary by several orders of magnitude. Scales for measuring quantities that have an extremely large range of normal values (e.g., sound volume, earthquake intensity, etc.) are typically logarithmic. For example, a small town may have three scheduled bus stops per day, whereas a major metropolitan area such as downtown Manhattan may have tens of thousands of scheduled bus stops per day. If Manhattan had a Transit Score of 100, then on a linear scale the downtown area of a small town might have a Transit Score of 0.01, whereas a logarithmic score might rate Manhattan as 100 and the small town as 10. Here, the logarithmic score better matches a rider's experience because the added utility of one additional bus route in a small town may exceed the utility of ten additional bus routes in downtown Manhattan.

In order to normalize the raw Transit Score to a 0 to 100 scale, a "perfect score" location is selected and used as a reference. For example, the Transit Score of the center of one or more cities with substantially full transit data available (e.g., San Francisco, Chicago, Boston, Portland, and Washington, D.C.) may be averaged to create a canonical 100 Transit Score. For example, the LAPS or the user may select San Francisco, Chicago, Boston, Portland, or Washington, D.C.—or any combination of those cities—as the perfect score location. The Transit Score from the selected city (or the combined or average Transit Score for multiple selected cities) may then be used as the "perfect score" used to calculate a normalized Transit Score from the raw Transit Score. It will be appreciated that other embodiments may use different scaling mechanisms (e.g., linear, exponential, logarithmic) or other forms of normalizing scores.

Other embodiments of this system may include calculating the quality of a transit network based on a "transit shed," which is the area reachable in a given time on a transit network for a location. For example, the number of points of interest reachable within a transit shed could be used to calculate a measure of the quality of transit networks. User feedback such as the quality of nearby transit network stops, routes, or other aspects of the public transportation system could also be used to calculate the quality of nearby transit network.

In addition to computing a transit score for a specified location such as a street address or cross streets, other areas for location assessments are contemplated, such as an aggregate (sum, average, etc.) location assessment of a larger location (i.e., a location that is larger than a point location), for example, a zip code area, a neighborhood, a city, a state, a country/region, etc. In some embodiments, Transit Scores are averaged or population weighted to calculate a score for an area. For example, a Transit Score for a larger area may be calculated by imposing a grid over the desired area and performing a calculation according to the following algorithm:

For each point in the grid:
  Expand each point by 0.00075 decimal places to create a grid cell
  Intersect the grid cell with the census blocks it intersects
  For each census block:
    Calculate percentage of the census block the grid cell intersects
    Multiple that percentage by the total population of that census block
    Sum these partial populations to get the grid cell population
  Add the grid cell population to a variable called total_population
  Calculate the Transit Score at the center of the grid cell and multiply it by the grid cell population to get the weighted Transit Score
  Add the weighted Transit Score of this grid cell to a variable called weighted_transit_score
Divide weighted_transit_score by total_population for the points within the boundary of the neighborhood or city to arrive at the Transit Score for the selected area.

In some embodiments, a transit shed is calculated so that the area reachable on a transit network in a given amount of time is used in the calculation of a Transit Score. A score generated in this way might be based on factors such as the number of people who are able to reach a specific location via transit networks in a given amount of time, the number of employment opportunities available within the area, or the number of available housing units available within the area. For example, a city government might create a scoring system based on the number of jobs reachable in 20 minutes on transit networks from a given location. A transportation planner might create a scoring system based on the number of people who live within a particular transit shed. These scores could be aggregated at various geographies such as the address, neighborhood, county, or city level. Additional details regarding transit sheds may be found in co-pending application Ser. No. 13/587,680, entitled SYSTEM AND METHOD FOR THE CALCULATION AND USE OF COMMUTE TIMES IN SEARCH AND OTHER APPLICATIONS, filed concurrently with the present application, the entirety of which is hereby incorporated by reference.

Figure 4:
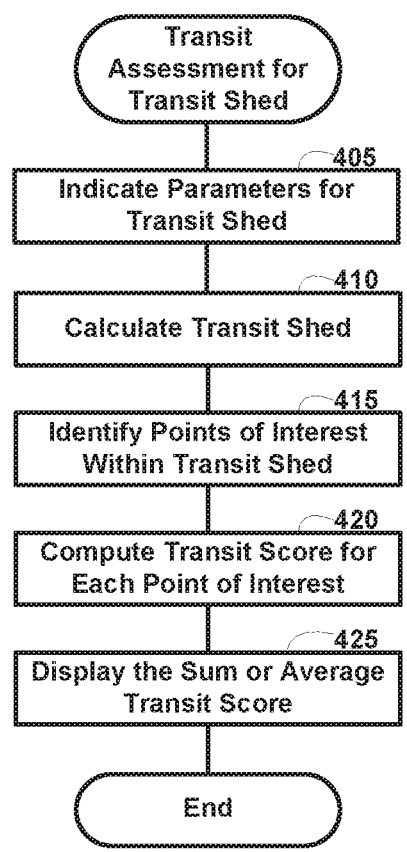
FIG. 4 is a flow diagram of a process for providing an example location assessment related to a transit network within a transit shed.

FIG. 4 is an example overview flow diagram of a process for providing an example location assessment for a transit shed. The illustrated routing may be performed by the LAPS 210, described with reference to FIG. 2. More specifically, at step 405 the LAPS receives an indication of parameters related to an area for which a transit shed is to be calculated. At step 410, the transit shed is calculated as described in the aforementioned co-pending application. At step 415, one or more points of interest within the transit shed are identified and, at step 420, the Transit Score is calculated for each identified point of interest, as described herein. At step 425, the LAPS displays a Transit Score reflecting the sum or the average of the Transit Scores that were calculated for each identified point of interest within the transit shed.

One potential use of a measure of the quality of a transit network is to measure the impact of potential changes to a transit network system. For example, a transit agency could analyze the impact of adding, removing, or changing routes or stops by measuring the change in Transit Score. One embodiment of this would be for the transit agency to provide a feed of their transit network system that includes the hypothetical new routes. This feed could be processed in the same way as the actual transit feed and differences in Transit Score could be compared. A transit network agency could then analyze the number of citizens impacted by this change and analyze changes in Transit Score.

In order to provide the most up-to-date transit network information, the LAPS may repeat the process of calculating the Transit Score to reflect changes due to route schedule changes, maintenance delays, traffic accidents, high ridership volume, or the like. After calculating the initial Transit Score for a specified location, the LAPS may recalculate the Transit Score automatically at predetermined intervals and update Transit Score 105 on the display of FIG. 1. In addition to automatic updates, the LAPS may update the Transit Score in response to system changes reported by an applicable transit authority, in response to system changes that are detected by the LAPS, or in response to system changes reported by one or more users or third-party sources. In addition, the Transit Score may be recalculated in response to a user request to update the Transit Score. A person of ordinary skill in the art will appreciate that a user may request an update to the Transit Score in a variety of ways, including for example clicking on an icon (not shown) in the example display of FIG. 1.

Figure 2:
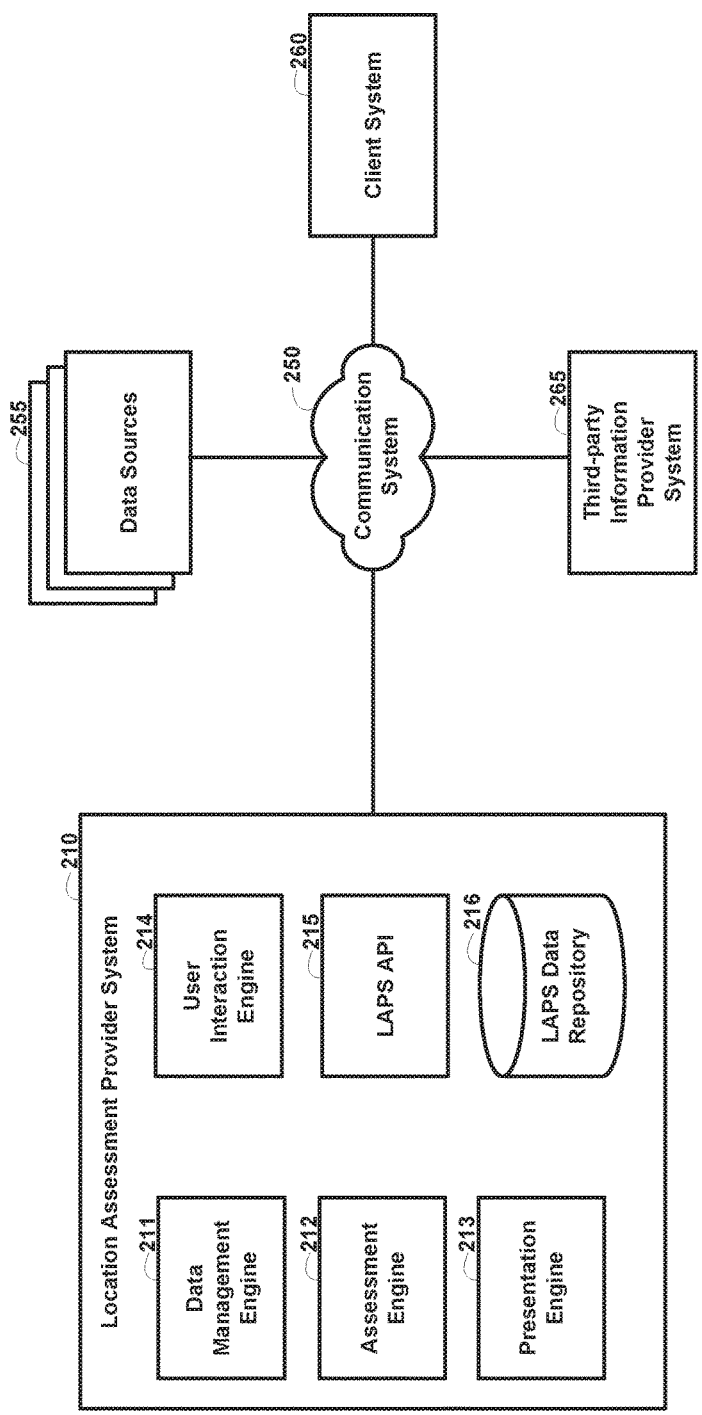
FIG. 2 is a diagram of functional modules in a representative embodiment of a Location Assessment Provider System.

FIG. 2 is an example block diagram of modules or components of an example embodiment of a Location Assessment Provider System. In some embodiments, the LAPS comprises one or more functional components/modules that work together to generate and provide assessments for specified locations, such as the Transit Score described with reference to FIG. 1. These modules may be implemented in software, firmware, and/or hardware, alone or in various combinations. FIG. 2 shows a LAPS 210 comprising a data management engine 211, an assessment engine 212, a presentation engine 213, a user interaction engine 214, a LAPS API ("Application Program Interface") 215, and a LAPS data repository 216. The LAPS 210 may be communicatively coupled, via a communication system 250, to one or more data sources 255, a client system 260, and a third-party information provider system 265.

The data management engine 211 manages transit network information for use by other modules of the LAPS 210. Managing transit network system information may include obtaining such information from the one or more data sources 255, and storing such obtained information in the LAPS data repository 216 for access by other modules of the LAPS 210. Managing transit network system information may also include determining the quality of (e.g., detecting errors in) obtained information, rectifying (e.g., correcting, adjusting, etc.) erroneous information, obtaining updated information (e.g., information related to system delays and route changes), and/or otherwise manipulating (e.g., formatting, translating, etc.) obtained information, such that information obtained from distinct data sources may be used or processed in a uniform and consistent manner. In some embodiments, erroneous information may be identified and/or corrected in various ways, such as based on user-provided feedback. In addition to correcting erroneous information, user-provided feedback also may be used to add new transit network information to the LAPS data repository. For example, a user may add data reflecting a bus route #37 that stops at a particular intersection at 8:15 a.m. and 1:30 p.m. on Mondays and Wednesdays, regardless of whether any information regarding bus route #37 previously existed in the LAPS data repository. In a similar fashion, a user may provide feedback to add route data for entirely new transit systems, such as privately owned transit systems or carpools, that did not previously exist in the LAPS data repository. While, in the examples illustrated, the data management engine 211 pre-fetches transit network system information for storage in the LAPS data repository 216, in other embodiments the data management engine 211 may also or alternatively provide a uniform interface with which other modules of the LAPS 210 may obtain on-demand information from at least some of the one or more data sources 255.

The user interaction engine 214 facilitates user access to, and customization of, various features of the LAPS 210. In particular, a user utilizing the client system 260 may interact with the LAPS 210 via the user interaction engine to provide street addresses or other indications of locations in order to obtain location assessments for those locations. For example, a request for an assessment of a specified location may be generated by the client system 260 (e.g., by a Web browser executing on the client system) and communicated to the user interaction engine 214. The user interaction engine 214 then forwards the received request to the assessment engine 212. In response, the assessment engine 212 generates an assessment of the specified location and provides it to the client system 260, either directly, via the user interaction engine 214, or some other module. The user interaction engine 214 may also provide user management functionality, such as the establishment and management of user accounts that may be used to store user customizations, preferences (e.g., display preferences, indications of frequently assessed locations, etc.), and/or other user-related information (e.g., payment information when access to the LAPS 210 is provided in exchange for payment). Such user-related information may be stored by the user interaction engine 214 in the LAPS data repository 216 for access by other modules.

The assessment engine 212 generates location assessments in response to provided indications of locations. As noted above, the assessment engine 212 may receive indications of locations from the user interaction engine 214. It may also receive indications from other sources, such as directly from client systems 260, the LAPS API 215, and/or third-party information providers 265. The assessment engine 212 may utilize services provided by other illustrated modules, such as the presentation engine 213, the data management engine 211, etc. For example, the assessment engine 212 may generate assessments based on information stored in the LAPS data repository 216 (e.g., information about public transportation system features associated with the indicated location) and/or information received from the one or more data sources 255 (e.g., searching for and obtaining information about public transportation system features from a search engine or other network-accessible information provider).

The presentation engine 213 generates representations of location assessments provided by the assessment engine 212. Such representations may include visual representations, such as graphical maps of a specified area that are possibly augmented in various ways (e.g., with one or more icons indicating stops along routes in the transit network system, color coding, etc.), scores (e.g., a number), graphical scales, textual descriptions (e.g., a text describing a particular assessment, etc.), etc. The generated representations may also be in non-visual forms, such as audio messages for the visually impaired describing an assessment that may be automatically generated via text-to-speech translation or other mechanisms. The presentation engine 213 may also generate representations of location assessments based on user preferences stored in the LAPS data repository 216, so as to provide customized views that are specialized for particular client systems (e.g., PDAs, cell phones, etc.) and/or user preferences.

The LAPS API 215 provides programmatic access to various features and/or functions of the LAPS 210. For example, the LAPS API 215 may provide a programmatic interface by which remote computing systems may programmatically interact with the LAPS 210, such as by allowing the third-party information provider system 265 to access one or more services provided by the assessment engine 212 in order to provide location assessments in the context of some other application. In some embodiments, the third-party information provider system 265 may include a Web site and/or other software application that provides public transportation services to client systems 260. The third-party information provider system 265 may incorporate (e.g., embed) assessments of locations (e.g., a particular address or street intersection and their surrounding areas) along with other information about those locations. In addition, the API 215 may also provide programmatic interface to a client application utilized by a user to interact with the LAPS 210 in various ways. For example, the functionality exposed via the API 215 may support the development of custom applications operating on portable client devices (e.g., smart phones, PDAs, pagers, etc.), custom hardware (e.g., kiosk-based systems), etc. Furthermore, the API 215 may support the "bulk" acquisition of assessments for large numbers of distinct locations, possibly in exchange for payment.

The client system 260 may include various types of computing systems. For example, in some embodiments the client system 260 may be a desktop computing system executing a Web browser that may be used by a user to interactively obtain information from the LAPS 210. In another embodiment, the client system 260 may be a mobile computing device (e.g., a mobile phone, PDA, etc.) having location aware functionality (e.g., a GPS system). In such a case, the client system 260 may, either automatically (e.g., on a periodic basis, at a specific time, upon the occurrence of a particular event, etc.) or in response to a user request (e.g., a button press), provide an indication of a current location of the client system 260 to the LAPS 210 in order to obtain an assessment for the current location and to display such to the user. For example, a GPS-capable mobile phone may periodically (e.g., every minute) provide an indication of the current location of the mobile phone to the LAPS 210 in order to obtain and display a continuously updated, current location assessment to a user who is traveling about a city or other area. As noted above, location assessments need not necessarily be visually presented. For example, a mobile phone client device may beep or vibrate when a particular location assessment crosses some predetermined or selected threshold. For example, in the context of transit network assessments, a mobile phone may vibrate when a transit network assessment of the current location of the mobile phone drops below a particular threshold, in order to notify a user that they are entering a neighborhood where a transit network may not be readily available.

Figure 3:
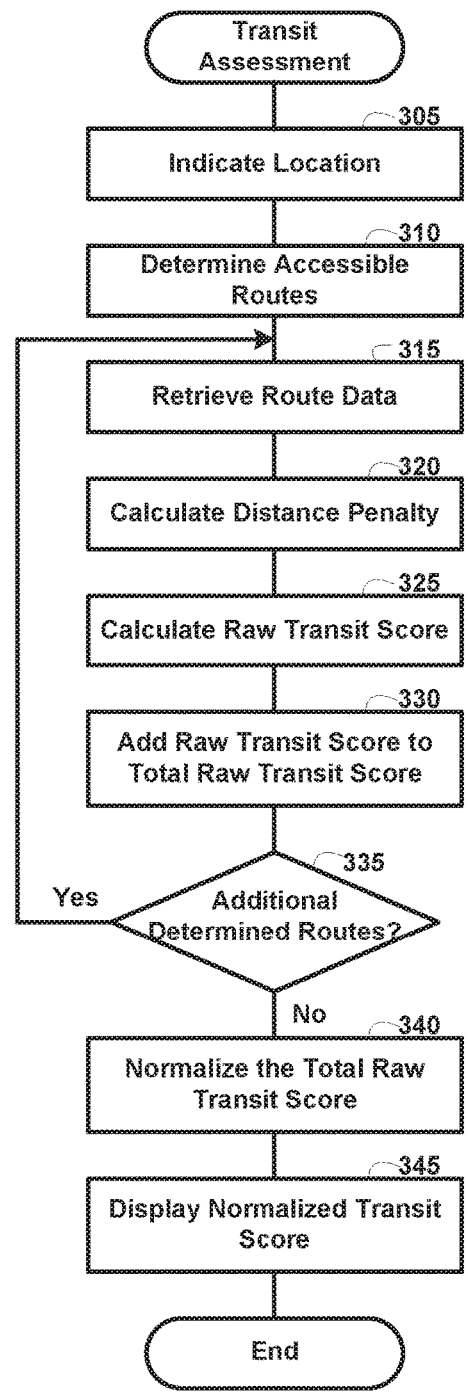
FIG. 3 is a flow diagram of a process for providing an example location assessment related to a transit network using a Location Assessment Provider System.

FIG. 3 is an example overview flow diagram of a process for providing an example location assessment using an example embodiment of a Location Assessment Provider System. The illustrated routing may be performed by the LAPS 210, described with reference to FIG. 2, to generate, for example, the Transit Score assessment described with reference to FIG. 1. The illustrated process demonstrates the generation and provision of location assessments in response to received indications of locations (e.g., street addresses), such as may be received from Web browsers executing on the client system 260.

More specifically, at step 305 the LAPS receives an indication of a location such as a street address. At step 310, the LAPS determines the transit network routes that are accessible from the specified location. For each transit network route determined in step 310, the LAPS repeats steps 315, 320, 325, and 330 to determine the raw Transit Score for each determined transit network route. At step 315, the LAPS retrieves data relevant to the determined transit network route. For example, the LAPS may retrieve data including the location of the nearest station along the route, the frequency of the route, and the type of route. At step 320, the LAPS uses the retrieved information to calculate a distance penalty for the determined route. At step 325, the LAPS calculates the raw Transit Score for the determined route, and, at step 330, the LAPS adds the calculated raw Transit Score for the determined route to the total raw Transit Score for all of the determined routes. At step 335, the LAPS determines whether it must continue calculating raw Transit Scores for any remaining transit network routes that were determined at step 310 to be accessible from the specified location. If the raw Transit Score for additional determined transit network routes needs to be calculated, the LAPS repeats steps 315, 320, 325, and 330 for the next determined transit network route for which a calculation has not yet been made. Otherwise, the LAPS proceeds to step 340, where the LAPS normalizes the total raw Transit Score to determine the normalized Transit Score. The normalized Transit Score is then displayed at step 345.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A computer-implemented method comprising:
   obtaining transit information identifying a plurality of transit access points within a geographical area;
   determining a plurality of locations within the geographical area on which to conduct a location assessment;
   for each location of the plurality of locations, conducting the location assessment, wherein conducting the location assessment comprises:
      inspecting the transit information for the geographical area to determine transit access points within a threshold distance of the location;
      for each transit access point of at least some of the transit access points, assigning a weighted value to the transit access point based at least in part on:
         a distance between the location and the transit access point, and
         a frequency of service on a transit route servicing the transit access point; and
      combining the weighted values into a location score for the location;
   storing the location score for each location of the plurality of locations within a memory as location score information for the geographical area;
   receiving from a computing device, over a communication network, a request for information regarding the geographical area;
   transmitting to the computing device, over the communication network, interface instructions configured to output an interface enabling selection of a location from the plurality of locations within the geographical area;
   receiving an indication of the location made within the interface;
   retrieving the location score of the indicated location, as stored in the memory; and
   transmitting the location score of the indicated location to the computing device.

2. The computer-implemented method of claim 1 further comprising obtaining updated transit score information for the geographical area and updating a location score for at least one location of the plurality of locations by repeating the location assessment for the at least one location.

3. The computer-implemented method of claim 2, wherein the location assessment is repeated at predetermined time intervals.

4. The computer-implemented method of claim 2, wherein the location assessment is repeated in response to a user request.

5. The computer-implemented method of claim 1, wherein the indicated location is identified by at least one of a zip code area, a neighborhood, a city, a state, a country, or a geographical region.

6. The computer-implemented method of claim 1, wherein the indicated location is a neighborhood.

7. The computer-implemented method of claim 1, wherein the indicated location is a metropolitan area.

8. The computer-implemented method of claim 1, wherein the location score of the indicated location is presented along with other information about the indicated location.

9. The computer-implemented method of claim 1, wherein the location score of the indicated location is normalized based on a perfect score corresponding to a perfect score location that is different from the indicated location.

10. The computer-implemented method of claim 9, wherein the perfect score location is a city for which transit network information is available.

11. The computer-implemented method of claim 9, wherein the perfect score location comprises multiple cities for which transit network information is available.

12. A computing system comprising:
    a memory storing transit information for a geographical area, wherein the transit information identifies a plurality of transit access points within the geographical area; and
    a processor configured with computer executable instructions to:
       determine a plurality of locations within the geographical area on which to conduct a location assessment;
       for each location of the plurality of locations, conduct the location assessment, wherein the location assessment comprises:
          inspecting the transit information for the geographical area to determine transit access points within a threshold distance of the location;
          for each transit access point of at least some of the transit access points, assigning a weighted value to the transit access point based at least in part on:
             a distance between the location and the transit access point, and
             a frequency of service on a transit route servicing the transit access point; and
          combining the weighted values into a location score for the location;
       store the location score for each location of the plurality of locations within the memory as location score information for the geographical area;

receive from a computing device, over a communication network, a request for information regarding the geographical area;

transmit to the computing device, over the communication network, interface instructions configured to output an interface enabling selection of a location from the plurality of locations within the geographical area;

receive an indication of a location made within the interface;

retrieve the location score of the indicated location, as stored in the memory; and transmit the location score of the indicated location to the computing device.

13. The computing system of claim 12, wherein the processor is configured with computer executable instructions to repeat the location assessment for each location of the plurality of locations at predetermined time intervals.

14. The computing system of claim 12, wherein the indicated location is a zip code area, a neighborhood, a city, a state, a country, or a geographical region.

15. The computing system of claim 12, wherein the indicated location is a neighborhood.

16. The computing system of claim 12, wherein the indicated location is a metropolitan area.

17. The computing system of claim 12, wherein the location score of the indicated location is presented along with other information about the indicated location.

18. The computing system of claim 12, wherein the location assessment further comprises normalizing the location score for each location of the plurality of locations based on a perfect score corresponding to a perfect score location.

19. The computing system of claim 18, wherein the perfect score location is a city for which transit network information is available.

20. The computing system of claim 18, wherein the perfect score location comprises multiple cities for which transit network information is available.

21. The system of claim 12, wherein the processor is further configured with computer executable instructions to obtain updated transit score information for the geographical area and update a location score for at least one location of the plurality of locations by repeating the location assessment for the at least one location.

22. The computing system of claim 21, wherein the processor is configured with computer executable instructions to update the location score for the at least one location of the plurality of locations in response to a user request.

23. Non-transitory computer-readable media including computer-executable instructions that, when executed by a computing system, cause the computing system to:

obtain transit information identifying a plurality of transit access points within a geographical area;

determine a plurality of locations within the geographical area on which to conduct a location assessment;

for each location of the plurality of locations, conduct the location assessment, wherein the location assessment comprises:

inspecting the transit information for the geographical area to determine transit access points within a threshold distance of the location;

for each transit access point of at least some of the transit access points, assigning a weighted value to the transit access point based at least in part on:

a distance between the location and the transit access point, and a frequency of service on a transit route servicing the transit access point; and combining the weighted values into a location score for the location;

store the location score for each location of the plurality of locations within a memory as location score information for the geographical area;

receive from a computing device, over a communication network, a request for information regarding the geographical area;

transmit to the computing device, over the communication network, interface instructions configured to output an interface enabling selection of a location from the plurality of locations within the geographical area;

receive an indication of a location selected via the interface;

retrieve the location score of the indicated location, as stored in the memory; and transmit the location score of the indicated location to the computing device.

24. The non-transitory computer-readable media of claim 23, wherein the computer-executable instructions further cause the computing system to obtain updated transit score information for the geographical area and update a location score for at least one location of the plurality of locations by repeating the location assessment for the at least one location.

25. The non-transitory computer-readable media of claim 23, wherein the computer-executable instructions further cause the computing system to repeat the location assessment for each location of the plurality of locations at predetermined time intervals.

26. The non-transitory computer-readable media of claim 23, wherein the computer-executable further cause the computing system to update the location score for the at least one location of the plurality of locations in response to a user request.

27. The non-transitory computer-readable media of claim 23, wherein computer-executable further cause the computing system to normalize the location score for each location of the plurality of locations based on a perfect score.

* * * * *